United States Patent
Tomita et al.

(10) Patent No.: US 6,173,121 B1
(45) Date of Patent: *Jan. 9, 2001

(54) MOTION COMPENSATION DETECTION DEVICE FOR AN OPTICAL SYSTEM

(75) Inventors: Hiroyuki Tomita, Kawasaki; Hideki Yamaguchi, Mishima, both of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/028,933

(22) Filed: Feb. 24, 1998

(30) Foreign Application Priority Data

Mar. 18, 1997 (JP) .................................. 9-064386

(51) Int. Cl.[7] .................................. G03B 17/00
(52) U.S. Cl. .............................. 396/52; 396/55
(58) Field of Search ...................... 346/52, 53, 54, 346/55

(56) References Cited

U.S. PATENT DOCUMENTS

| 5,041,852 | 8/1991 | Misawa et al. . | |
|---|---|---|---|
| 5,745,799 | * 4/1998 | Morofuji | 396/55 |
| 5,761,545 | * 6/1998 | Tanaka et al. | 396/53 |
| 5,809,346 | * 9/1998 | Fujisaki | 396/55 |
| 5,809,347 | * 9/1998 | Usui | 396/53 |
| 5,842,054 | * 11/1998 | Suzuki et al. | 396/55 |

FOREIGN PATENT DOCUMENTS

| 0 543 394 A2 | 5/1993 | (EP) . |
|---|---|---|
| 4-76525 | 3/1992 | (JP) . |
| 4-211230 | 8/1992 | (JP) . |
| 5-142614 | 6/1993 | (JP) . |
| 7-261234 | 10/1995 | (JP) . |

* cited by examiner

Primary Examiner—W. B. Perkey

(57) ABSTRACT

A motion compensation device which detects vibration of an optical system and can discriminate between undesired movement or vibration of photographic equipment and intentional movement of the photographic equipment and compensate for the undesired movement while not compensating for the intentional movement. The motion compensation device contains a decision unit which calculates a variance value based on an angular velocity signal supplied by am angular velocity sensor. The decision unit then compares this variance value with a predetermined decision level value and determines if a large movement has occurred due to a photographic composition change, panning photography or the operator following of a randomly moving subject. A target value calculation unit, based on the decision result of the decision unit, calculates a target value of vibration motion compensation control to be executed. The target value calculation unit then varies the target value of vibration motion compensation control when large movements are detected by the angular velocity sensor. This motion compensation device may be contained within a lens barrel or camera body.

23 Claims, 11 Drawing Sheets

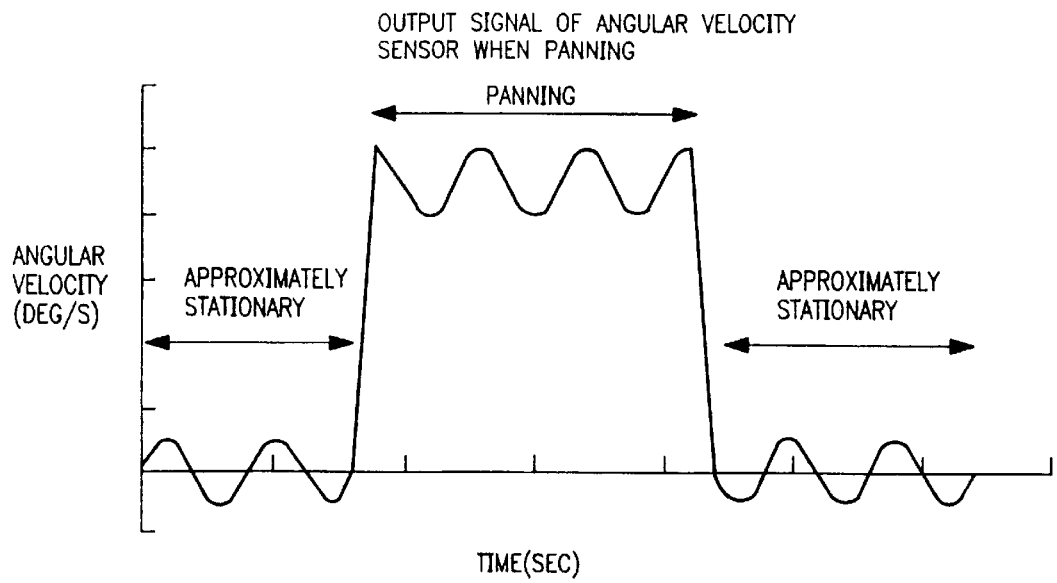
FIG. IOA
PRIOR ART
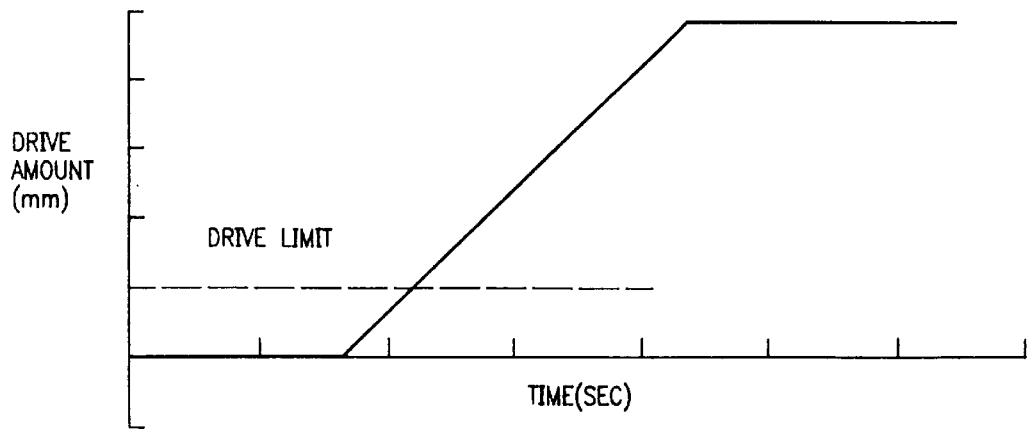
FIG. IOB
PRIOR ART

MOTION COMPENSATION DETECTION DEVICE FOR AN OPTICAL SYSTEM

CROSS-REFERENCE TO RELATED APPLICATIONS

This application is based upon and claims priority of a Japanese Patent Application No. 09-064386 filed Mar. 18, 1997, the contents of which are incorporated herein by reference.

BACKGROUND OF THE INVENTION

1. Field of the Invention

The present invention relates to a motion compensation device which detects vibration of an optical system caused by hand tremors and other sources of undesired vibration. In particular, the present invention relates to a device which can discriminate between undesired movement or vibration of photographic equipment and intentional movement of the photographic equipment and compensate for the undesired movement while not compensating for the desired movement.

2. Description of the Related Art

Optical systems project an image onto an image plane. Conventional image blur suppression device suppress, or reduce, blurring of the image. A motion compensation device is a type of image blur suppression device, and compensates for motion incident upon the optical system. Motion is typically imparted to the optical system by vibrations in the optical system, or in a surrounding holding member. In general, conventional motion compensation devices cause a compensation lens to shift counter to the motion of the optical system so as to shift the image projected by the optical system relative to the optical system. Conventional cameras use a motion compensation device to suppress image blur resulting from motion of the camera. Such motion is typically caused by hand tremors of the photographer.

A motion compensation in the prior art has a structure as disclosed in Japanese Laid-Open Patent Publication JP-A-4-76525 In FIG. 3 of JP-A-4-76525, the overall structure of a prior art optical system which performs motion compensation is shown. A camera having the motion compensation capability of JP-A-4-76525 is equipped with a blurring motion compensation lens which is capable of parallel motion in a plane at right angles to the optical axis. A drive actuator is used to drive the blurring motion compensation lens in up and down, and left and right directions. This drive actuator includes: a lens frame member which supports the blurring motion compensation lens; a plate member which supports this lens frame member; four wires mounted on the plate member; a body which supports these wires; a wound coil; a yoke; and a permanent magnet. A position detection device is included in the drive actuator and detects the position of the blurring motion compensation lens. This position detection device includes a light generating element and a light receiving element.

The operation of the prior art motion compensation devices will be described below with reference to FIG. 8.

FIG. 8 is a block diagram of a prior art blurring motion compensation device.

In FIG. 8 an angular velocity sensor 10 would include a piezoelectric vibration type of angular velocity sensor used to detect a Coriolis force, and is a sensor to monitor the vibration of the camera. The output signal of the angular velocity sensor 10 is input to an integration unit 40 which integrates this output signal over time. After the integration unit 40 has converted the output signal of the angular velocity sensor 10 into a blurring motion angle of the camera, this angle is converted into target drive information for the blurring motion detection lens. A servo circuit 100 is used to drive the blurring motion compensation lens according to the target drive position information. The servo circuit 100 calculates the difference in the target drive position information and the position information of the blurring motion compensation lens, and outputs a signal to an actuator 110. The actuator 110, based on this signal, drives the blurring motion compensation lens within a plane at right angles to the optical axis. A position detection device 120 monitors the movement of the blurring motion compensation lens and feeds it back to the servo circuit 100.

In the prior art of motion compensation devices, once the integration unit 40 integrates the output signal of the angular velocity sensor 10, the information is converted into angular displacement information. As a result of this conversion, when the integration unit integrates the output signal of the angular velocity sensor 10 over time, it is necessary to set a constant of integration (referred to as a "standard value" hereinafter) including the target value of control. The output signal (referred to as "omega zero" hereinafter) of the angular velocity sensor, when the camera is stationary, is generally used as this standard value. This method of calculating the standard value is shown in FIG. 17 and FIG. 18 of Japanese Laid-Open Patent Publication JP-A-4-211230.

The blurring motion sensor of the motion compensation device disclosed in JP-A-4-211230 is equipped with an angular velocity sensor which detects Coriolis force. A drift component detection unit which includes a central processing unit ("CPU") and a memory, calculates the average value of the output signal of the angular velocity sensor sampled in an interval from the present time to a predetermined earlier time. By subtracting the average value of the output signal of the angular velocity sensor the drift component detection unit eliminates the drift portion of the motion detected and outputs this subtraction value.

Output signals of the angular velocity sensor are input every 10 ms into the drift component detection unit. Thereby fifty output signals are input every 0.5 second (10 ms×50). The calculated average value (referred to as "average 1" hereinafter) of these fifty output signals is stored in the memory of the drift component detection unit. After ten seconds (0.5 seconds×20) has elapsed, the average 1 of a further 20 samples is input. Accordingly, after ten seconds have elapsed from the start, the average can be calculated of 1,000 (50×20) output signals of the angular velocity sensor.

In the motion compensation devices of the prior art a problem is encountered when a large and usually intentional movement is detected. These large movements are usually a result of the camera operator changing the composition of the photograph by panning the camera to follow a moving subject or to focus on another subject (referred to as "field of view angle changes" hereafter). As far as the motion compensation device is concerned, these field of view angle changes are random and cannot be distinguished easily from other sources of vibration. The motion compensation device driving the blurring motion compensation lens in an attempt to compensate for these field of view angle changes runs into the movement limits (referred to as "drive limits" hereafter) of the blurring motion compensation lens which distorts the photograph taken and possibly damages the motion compensation device.

FIG. 9A and FIG. 9B are diagrams depicting examples of the output signal of an angular velocity sensor and the resulting drive amount of the blurring motion compensation lens over a period of time when photographic composition changes occur.

Referring to FIG. 9A, when the camera is completely stationary the angular velocity detected is 0 deg/s. As shown in FIG. 9A, the output signal suddenly rises when there is a change in the picture composition. Prior to this sudden change in photographic composition, the camera is approximately stationary in position. The camera is not completely stationary due to the addition of undesired motion such as hand tremors which must be accounted for in this example. For the sake of simplicity, these operator hand tremors are drawn as a sine wave.

FIG. 9B shows the drive amount of the blurring motion compensation lens resulting from the angular velocity sensor of FIG. 9A integrating the output signal as the target value equal to 0. The blurring motion compensation lens, as shown in FIG. 9B, moves in unison with the output signal shown in FIG. 9A. However, as shown by the broken line in FIG. 9B, there exists a drive limitation for the blurring motion compensation lens. Due to this drive limitation, when a large movement of the camera occurs due to a photographic composition change and other causes, the blurring motion compensation lens reaches the drive (movement) limit, and cannot be driven beyond this point. As a result, a vibration motion cannot be compensated for using the blurring motion compensation lens.

In addition, the time interval from t1 to t2 shown in FIG. 9B is the period of initiation of a photographic change, and because the blurring motion compensation lens is in a region within the drive limits, vibration motion can be compensated using the blurring motion compensation lens. However, from the point of view of the camera operator, a very disconcerting phenomena is seen through the viewfinder of the camera. When the camera operator starts panning the camera and causes a field of view change, the motion compensation device compensates for the movement and the image the operator sees does not move in spite of the operator's intentional movement of the camera. Then once the drive limit of the blurring motion compensation lens is reached the image seen by the operator and recorded by the camera suddenly jumps making for a very unnatural view and recording of images by the camera. Because of this phenomena, compensating for vibration motion while making field of view angle changes, it becomes necessary to be able to identify when large movements take place. Japanese Laid-Open Patent Publications JP-A-5-142614 and JP-A-7-261234, provide a method of detecting such large movements due to a field of view angle changes.

FIG. 10A and FIG. 10B are diagrams showing an example of the movement amount of the blurring motion compensation lens and the output signal of the angular velocity sensor when panning. FIG. 10A is a diagram showing the output signal of the angular velocity sensor, and FIG. 10B is a diagram showing the movement amount of the blurring motion compensation lens. In the detection method described in JP-A-5-142614 and JP-A-7-261234, when the output of the detector for a predetermined time is in a fixed direction, it was determined that there is a field of view angle change. As a result, using this detection method as shown in FIG. 10A, when the camera is panned in one direction for a given amount of time, it would be determined that the field of view angle changed.

FIGS. 11A and 11B shows an example of the movement amount of the blurring motion compensation lens and the output signal of the angular velocity sensor when following a subject. FIG. 11A shows the output signal of the angular velocity sensor, and FIG. 11B shows the movement amount of the blurring motion compensation lens.

FIG. 11A shows the output signal of the angular velocity sensor when following the movement of a subject, such as a soccer player, in which random movements occur frequently. As shown in FIG. 11A, the output signal of the angular velocity sensor, as shown in FIG. 10A, does not move in one direction only, but a large output signal is generated in both directions. As a result, using the detection method described in JP-A-5-142614, it cannot be determined that there w as a change in field of view angle.

In this manner, in the prior art motion compensation devices, because there was no way of determining when the operator would intentionally move the camera, the problem arises that vibration motion compensation cannot be performed. In addition, in the prior art vibration motion compensation devices, the problem exists that the image seen in the viewfinder is unnatural. Also, as described in JP-A-5-142614, in the case that the output signal is in a fixed direction for a predetermined time, the vibration detection method would determine that a large movement in the camera is occurring and it could not handle movement of a randomly moving body.

Therefore, it is recognized in the field of photography and optical imaging that a vibration motion detection device is needed which can compensate for undesired vibration with a high degree of precision and naturally track objects when large random movements due to field of view angle changes occur.

SUMMARY OF THE INVENTION

An object of the present invention is to provide a motion compensation device which can discriminate between undesired movement or vibration of photographic equipment and intentional movement of the photographic equipment and compensate for the undesired movement while not compensating for the desired movement.

Objects and advantages of the present invention are achieved in accordance with embodiments by a vibration motion detection device that comprises a vibration motion detection unit to detect vibration motion and output a vibration motion detection signal, a variance value calculation unit to calculate a variance value based on the vibration motion detection signal, and a motion state decision unit to determine the motion state of the vibration motion detection unit based on the variance value.

Further objects of the present invention are achieved by a vibration motion detection device which comprises a vibration motion detection unit to detect vibration motion and output a vibration motion detection signal, and a variance value calculation unit to calculate a variance value based on the vibration motion detection signal. A motion state decision unit is included in the device to determine the motion state of the vibration motion detection unit based on the variance value as well as a target value calculation unit to calculate a target value based on the vibration motion detection signal.

Still further objects of the present invention are achieved by a camera which comprises a camera body having a power supply and a lens barrel connectable to the camera body. Within the lens barrel, devices are contained and receive power from the camera body including: a vibration motion detection unit to detect vibration motion and output a vibration motion detection signal; a variance value calculation unit to calculate a variance value based on the vibration motion detection signal; a motion state decision unit to determine the motion state of the vibration motion detection unit based on the variance value; and a target value calculation unit to calculate a target value based on the vibration motion detection signal.

In accordance with embodiments of the present invention, the variance value calculation unit calculates the variance value based on an average value of a series of output values output from the vibration motion detection unit within a predetermined time period.

In accordance with embodiments of the present invention, the variance value calculation unit calculates the variance value based on at least a portion of a series of output values output from the vibration motion detection unit within a predetermined time period and output after the passage of a predetermined time period.

In accordance with embodiments of the present invention, the vibration motion detection unit is an acceleration detector to detect acceleration or a velocity detector to detect velocity.

In accordance with embodiments of the present invention, the motion state decision unit determines that the vibration motion detection unit is in a motion state when the variance value exceeds a predetermined value.

In accordance with embodiments of the present invention, the vibration motion detection device also includes a target value calculation unit to calculate a target value based on the vibration motion detection signal.

In accordance with embodiments of the present invention, the target value calculation unit varies the target value of the vibration motion detection signal based on the variance value.

In accordance with embodiments of the present invention, the vibration motion detection device also includes an amplifier to amplify the vibration motion detection signal, and the variance value calculation unit calculating the variance value based on the vibration motion detection signal amplified by the amplifier.

In accordance with embodiments of the present invention, the vibration motion detection device also includes an amplifier to amplify the vibration motion detection signal, and the target value calculation unit calculating the target value based on the vibration motion detection signal amplified by the amplifier.

BRIEF DESCRIPTION OF THE DRAWINGS

These and other objects and advantages of the invention will become apparent and more readily appreciated for the following description of the preferred embodiments, taken in conjunction with the accompanying drawings of which:

FIG. 10A is a diagram showing an example of the output signal of the angular velocity sensor when camera panning occur in the prior art;

FIG. 10B is a diagram showing the drive amount of the blurring motion compensation lens corresponding to the output signal of FIG. 10A;

DESCRIPTION OF THE PREFERRED EMBODIMENTS

Figure 1:
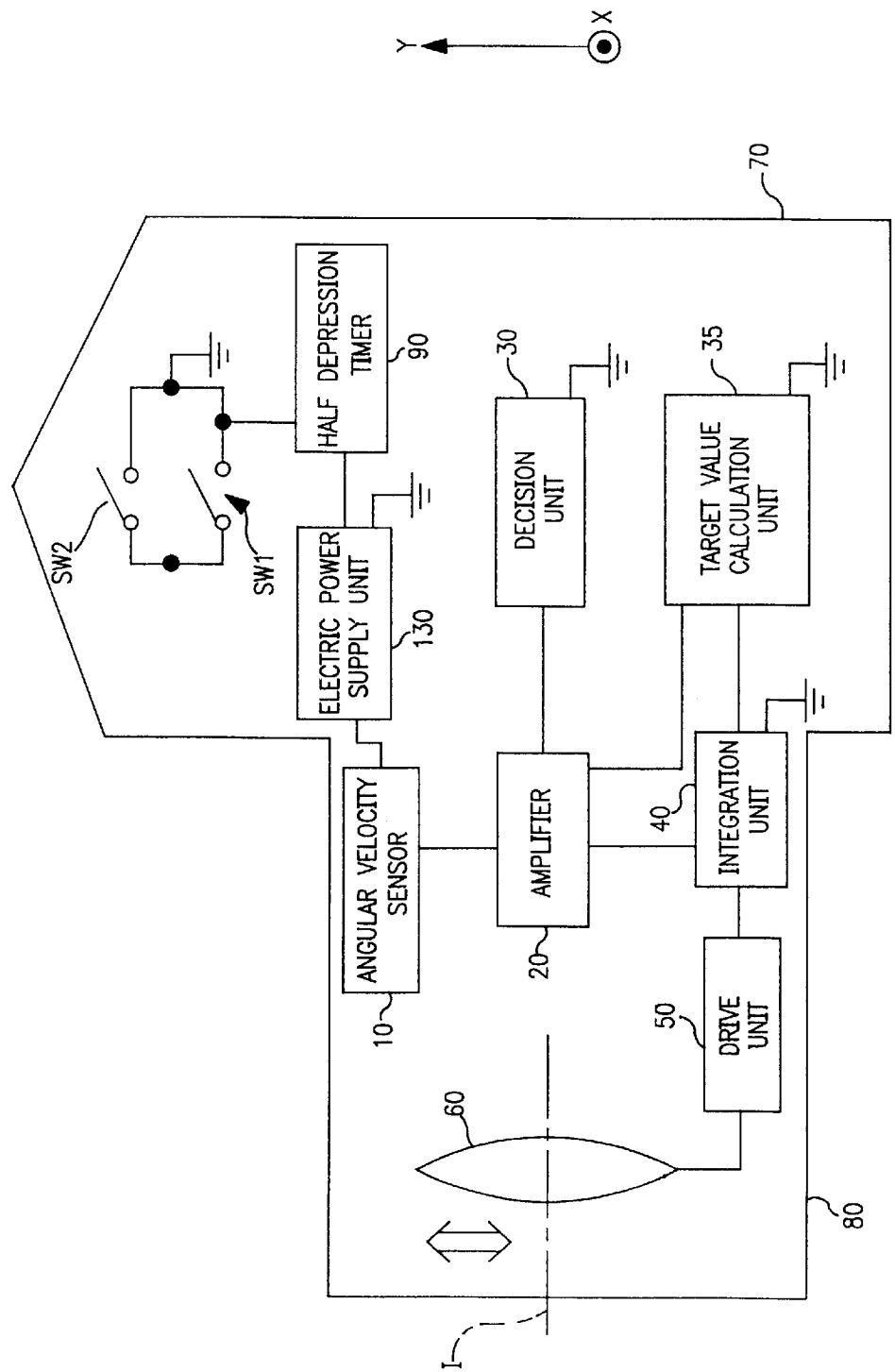
FIG. 1 is a cross sectional diagram schematically showing a single lens reflex camera containing a vibration motion detection device according to a first preferred embodiment of the present invention of the present invention.

Reference will now be made in detail to the preferred embodiments of the present invention, examples of which are illustrated in the accompanying drawings, wherein like reference numerals refer to like elements throughout.

First Preferred Embodiment

FIG. 1 is a cross sectional diagram schematically showing a single lens reflex camera containing a vibration motion detection device according to the first preferred embodiment of the present invention.

An angular velocity sensor 10 detects vibrations of the camera, and acts as a sensor which outputs a voltage value proportional to the Coriolis force acting on the camera. The angular velocity sensor 10, in order to detect angular velocity in two axial directions, normally contains two sensors. These sensors include a pitch angular velocity sensor which detects angular velocity around the X axis, and a yaw angular velocity sensor which detects angular velocity around the Y axis. In FIG. 1, the angular velocity sensor of one axis is omitted from the drawing. The angular velocity sensor 10 operates while a half depression timer 90 is ON, and it is possible to detect angular velocity. The detected vibration motion detection signal is output to an amplifier 20.

The amplifier 20 amplifies the output value of the angular velocity sensor 10. The amplified output signal is input to a decision unit 30, to a target value calculation unit 35, and an integration unit 40.

The decision unit 30 includes a variance value calculation unit which calculates a variance value of the vibration motion detection signal amplified by the amplifier 20, and decides whether there was a movement due to a field of view angle change by the camera in which the angular velocity sensor 10 is loaded. The decision unit 30 outputs to the target value calculation unit 35, a decision signal relating to whether there was a movement due to a field of view angle change.

The target value calculation unit 35 takes the output value of the angular velocity sensor 10 as amplified by the amplifier 20 when it is stationary and calculates a target value (omega zero value) for vibration motion compensation control. In addition, the target value calculation unit 35, based on the decision signal output from the decision unit 30, changes the calculation format of this target value, and thereby varies the target value. The target value calculation unit 35 outputs the calculated target value to an integration unit 40.

The integration unit 40 performs an integration calculation by subtracting the target value calculated by the target value calculation unit 35 from the vibration motion detection signal as amplified by the amplifier 20. The integration unit 40 converts the angular velocity signal into an angular displacement signal by using this integration calculation.

The drive unit 50, based on the angular displacement signal from the integration unit 40, outputs a drive signal to drive a vibration or blurring motion compensation lens 60. The drive unit 50 is equipped with a servo circuit and an actuator which drives the blurring motion compensation lens 60. The drive unit 50 also includes a position detection device to detect the drive position of the blurring motion compensation lens 60.

As shown in FIG. 1, the blurring motion compensation lens 60 compensates for vibration motion by being driven in a direction at right angles to the optical axis I. The blurring motion compensation lens 60 is built into the imaging optical system of the photographic device. The blurring motion compensation lens 60, based on the drive signal from the drive unit 50, compensates for blurring motion by moving the optical axis of the imaging optical system of the photographic device in the opposite direction of the vibration.

A lens barrel 80 houses the photographic optical system which includes the blurring motion compensation lens 60. The lens barrel 80 is interchangeable and is mounted to be freely detachable from the camera body 70.

An electrical power supply unit 130 supplies electric power to the angular velocity sensor 10 when a switch SW1 is ON. The electrical power supply 130 while the half depression timer 90 is ON, continues the supply of electrical power to the angular velocity sensor 10, and stops the supply of electric power to the angular velocity sensor 10 when the half depression timer is OFF.

The half depression timer 90 is a timer which is set ON when the half depression switch SW1 is ON. The half depression timer 90 remains ON while the half depression switch SW1 is pressed, and remains ON for a fixed time period when the half depression switch SW1 is turned OFF.

The half depression switch SW1 is a switch used to commence a series of photographic preparation operations. The ON operation of the half depression switch SW1 is coupled to the half depression action of a release button (not shown in the drawing).

A full depression switch SW2 is a switch in order to commence the exposure operation of the c amera and other photographic operations. The ON operation of the full depression switch SW2 is coupled to the full depress ion operation of the release button.

The operation of the vibration motion detection device according to the first preferred embodiment of the present invent ion will be described, with special emphasis on the operation of the decision unit.

Figure 2:
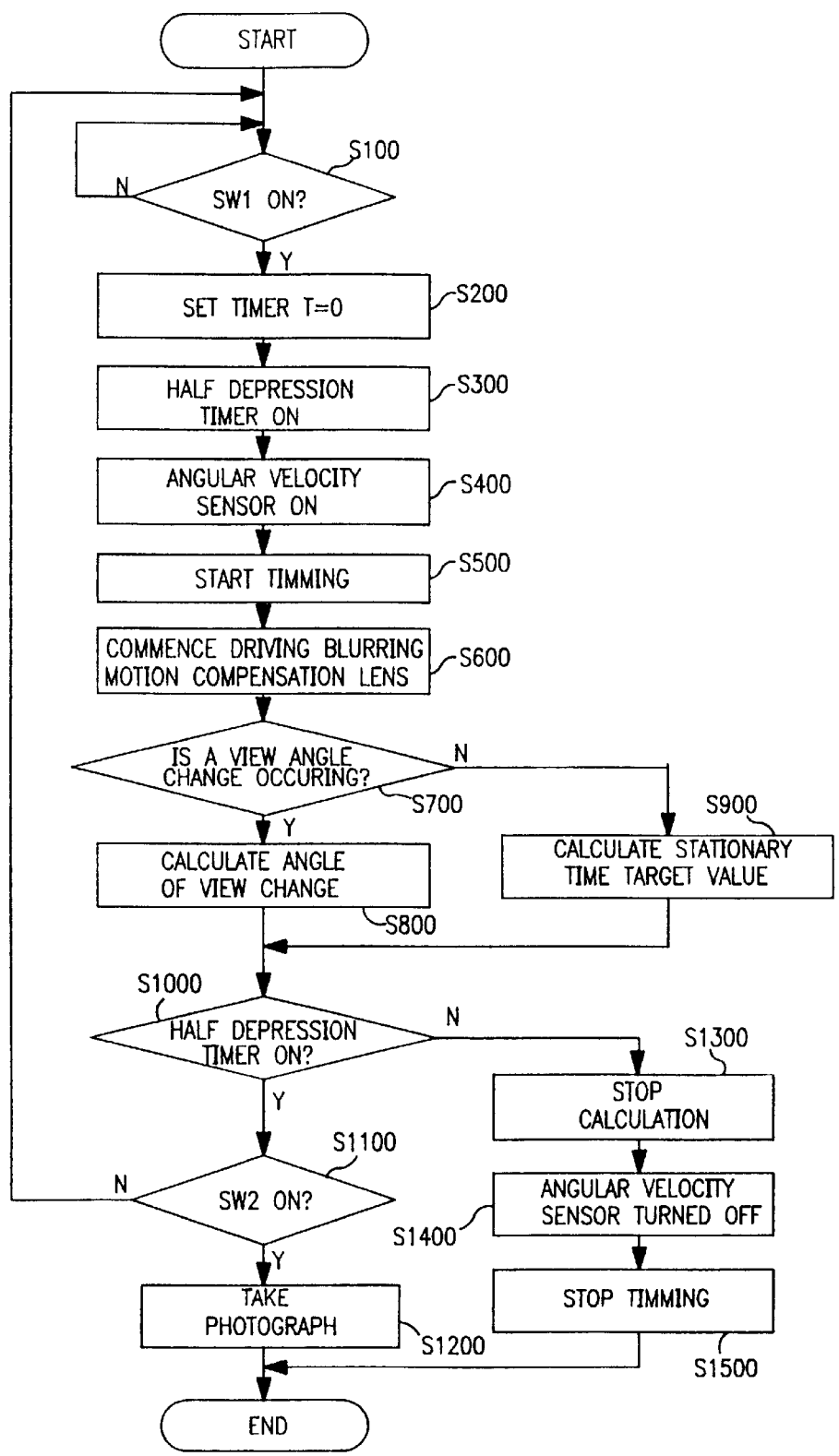
FIG. 2 is a flow chart which describes the operation of a single lens reflex camera which uses the vibration motion detection device according to the first preferred embodiment of the present invention.

FIG. 2 is a flow chart which describes the operation of a single lens reflex camera which uses the vibration motion detection device according to the first preferred embodiment of the present invention.

A photographic operation is started by setting ON a power supply switch on the camera body (not shown in the drawing) Further, in the description provided below, except where otherwise stated, each step is performed in the decision unit 30.

Referring to FIG. 2, in step (referred to as "S" hereinafter) 100, it is determined whether the half depression switch SW1 is set ON. When the half depression switch SW1 is set ON, the routine proceeds to S200. When the half depression switch SW1 is OFF, processing continues to repeat S100 until the half depression switch SW1 is set ON.

In S200, simultaneously with the half depression switch SW1 being set ON, the half depression timer 90 resets a time t of the timer to zero.

In S300, the half depression switch SW1 is ON, the half depression timer 90 time t was reset, and simultaneously the half depression timer 90 is set ON.

In S400, the power supply unit 130, simultaneously with the turning ON of the half depression timer 90, supplies electric power to the angular velocity sensor 10, and the angular velocity sensor 10 begins to operate. The angular velocity sensor 10 detects vibration present in the camera body 70 and lens barrel 80, and outputs a vibration motion detection signal.

In S500, the half depression timer 90 commences timing simultaneously with the half depression switch SW1 being set ON.

In S600, the drive unit 50 outputs a drive signal, and the blurring motion compensation lens 60 is driven based on this drive signal.

In S700, the decision unit 30 decides whether a field of view angle change is in progress. The decision unit 30 determines whether the camera is in an approximately stationary (referred to as "stationary stable state" hereinafter) or whether the camera is in the course of large movements due to field of view angle changes (referred to as "composition change state" hereinafter). When the camera is in a stationary stable state, the routine proceeds to S900. When composition change states are occurring, processing proceeds to S800. Further, a stationary stable state is not a state in which the camera is completely stationary, but in spite of the photographer's best efforts to make the camera stationary, is a state in which the camera vibrates due to the photographer's unintended hand tremor motions.

In S800, the target value calculation unit 35 calculates, based on the vibration motion detection signal, the target value of vibration motion compensation control in the field of view angle change state by changing to the calculation format of the target value in a stationary stable state. The integration unit 40, subtracting the output value of the target value calculation unit 35 from the output value of the amplifier 20 and performing an integration calculation, converts the angular velocity signal to an angular displacement signal. The drive unit 50 outputs a drive signal based on the angular displacement signal from the integration unit 40 and, based on this drive signal, compensates for vibration motion by adjusting the optical axis of the imaging optical system of the photographic device.

In S900, the target value calculation unit 35 calculates, based on the vibration motion detection signal, the target value of vibration motion compensation control in the stationary stable state. The integration unit 40, based on this target value, converts the angular velocity signal to an angular displacement signal, and the drive unit 50 drives the blurring motion compensation lens 60 based on this angular displacement signal.

In S1000, it is determined whether the half depression timer 90 is set ON. When the half depression timer 90 is set ON, the routine proceeds to S1100. When the half depression timer 90 is OFF, the routine proceeds to S1300.

In S1000, it is determined whether the full depression switch SW2 is set ON. When the full depression switch SW2 is set ON, the routine proceeds to S1200. When the full depression switch SW2 is set OFF, the routine proceeds to S100, and it is determined whether the half depression switch SW1 is set ON.

In S1200, the photographic operation is performed. This photographic operation includes: opening and closing the shutter using the shutter mechanism; winding the film by the film winding mechanism; and ending this sequence of operations.

In S1300, the decision unit 30 stops the calculation of variance values by the variance value calculation unit, and the target value calculation unit 35 stops the calculation of target values.

In S1400, the angular velocity sensor 10 is turned OFF. In S1000, when it has been determined that the half depression timer 90 is OFF, the electrical power supply unit 130, simultaneously with the OFF operation of the half depression timer 90, stops the supply of electrical power to the angular velocity sensor 10.

In S1500, the timing of the half depression timer 90 stops. The half depression timer 90 stops timing simultaneously with the OFF operation of the half depression switch 90, and the operation of the sequence ends.

The processing flow of calculations of the decision unit in the vibration motion detection device according to the first mode of embodiment of the present invention will next be described.

Figure 3:
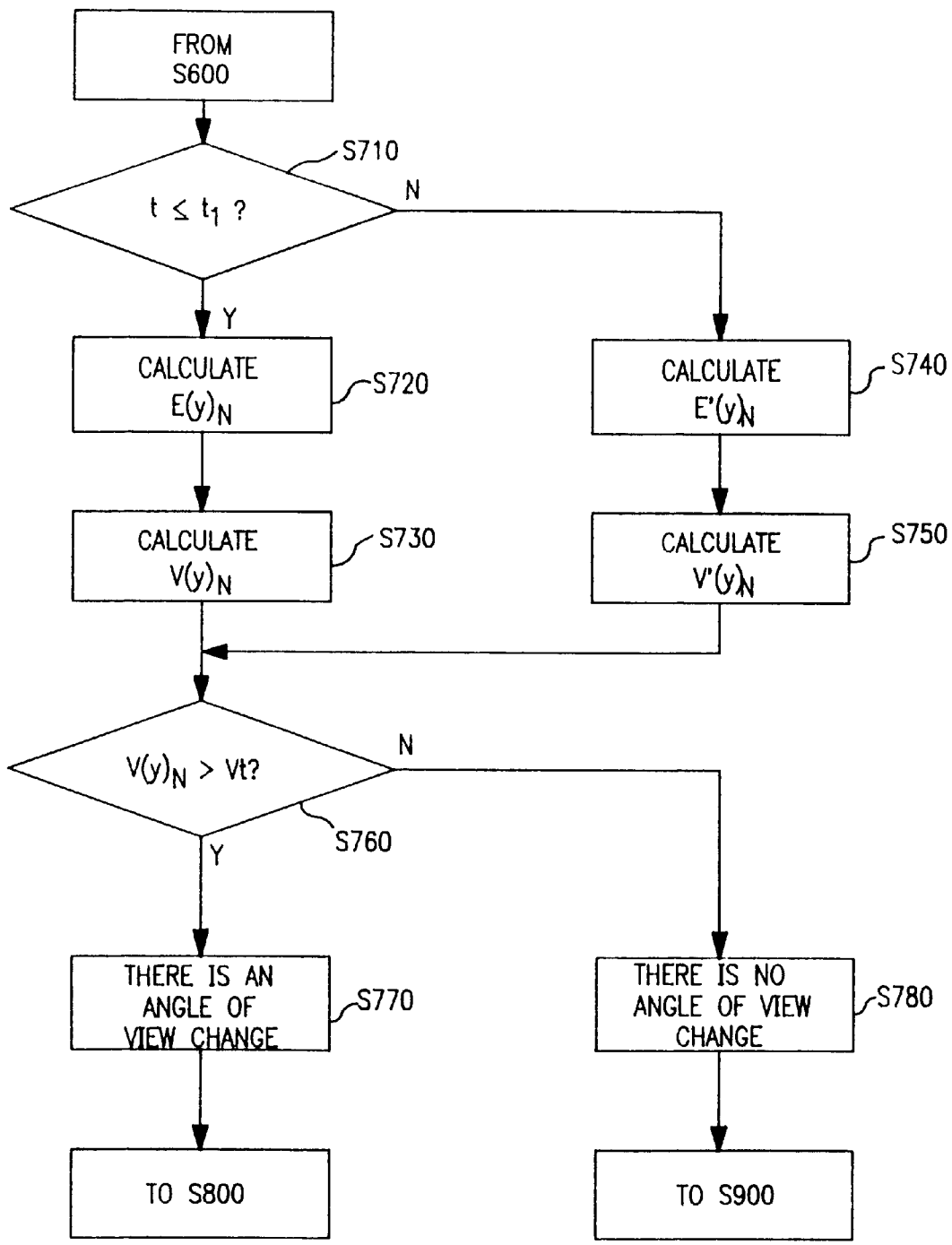
FIG. 3 is a flow chart which illustrates the flow of calculations of the decision unit in the vibration motion detection device according to the first preferred embodiment of the present invention.

FIG. 3 is a flow chart which illustrates the processing flow of calculations of the decision unit in the vibration motion detection device according to the first preferred embodiment of the present invention.

FIG. 3 gives a detailed description of S700 in FIG. 2 and the decision unit 30 performs calculations as described below.

Referring to FIG. 3, in S710, it is determined whether the clock time t is smaller than a decision level (decision value) $t_1$. When the elapsed time t, from the clock start of the half depression timer 90, is below the time decision level $t_1$, the routine proceeds to S720. When the elapsed time t, from the clock start of the half depression timer 90, exceeds the time decision level $t_1$, the routine proceeds to S740. Further, in the execution of S720 to S740, the decision unit 30 performs calculations using the output data from the angular velocity sensor 10 which were obtained up to a given time t.

In S720, the decision unit 30 calculates the average value $E(y)_N$ of the output value y of the angular velocity sensor 10 in the elapsed time t. The decision unit 30 finds the average value $E(y)_N$, based on all the blurring motion detection signals from the detection commencement (t=0) of the blurring motion detection signals to the time t by using the angular velocity sensor 10, from the following Equation 1, and proceeds to S730.

$$E(y)_N = \frac{1}{N}\sum_{i=1}^{N} y_N \qquad \text{Equation 1}$$

In Equation 1, N is the sample number and t is the time when N samples have been performed (N=t (sec)/sampling time (sec)).

In S730, the decision unit 30, using the variance value calculation unit, calculates a variance value $V(y)_N$ of elapsed time t. The decision unit 30 finds the variance $V(y)_N$ of the angular velocity values based on all of the vibration motion detection signals from detection commencement (t=0) of the vibration motion detection signals using the angular velocity sensor 10, and proceeds to S760.

$$V(y)_N = \frac{1}{N}\sum_{i=1}^{N} (y_i - E(y)_N)^2 \qquad \text{Equation 2}$$

In S740, the decision unit 30 calculates the average value $E'(y)_N$ of the output value y of the angular velocity sensor 10 in the calculation interval. The decision unit 30 calculates a moving average of only the data of the angular velocity sensor 10 in a range of some calculation interval K0 using Equation 3, and proceeds to S750.

$$E'(y)_N = \frac{1}{K0}\sum_{j=i-K0+1}^{i} y_j \qquad \text{Equation 3}$$

In Equation 3, K0 is the amount of data (K0=calculation interval (s)/sampling time (s)) in some calculation interval length.

In S750, the decision unit 30, using the variance value calculation unit, calculates a variance value $V'(y)_N$ of the elapsed time t in the calculation interval. The decision unit 30 finds the variance $V'(y)_N$ in only the data of the angular velocity sensor 10 in some range of calculation interval length K0, and proceeds to S760.

$$V'(y)_N = \frac{1}{K0}\sum_{j=i-K0+1}^{i} (y_j - E'(y)_N) \qquad \text{Equation 4}$$

In S760, the decision unit 30 determines whether the calculated variance value $V(y)_N$ or the variance value $V'(y)_N$ is greater than a decision level $V_t$. When the calculated variance value $V(y)_N$ is greater than the decision level $V_t$, execution proceeds to S770. When the calculated variance value $V(y)_N$ is less than the decision level $V_t$, the routine proceeds to S780.

In S770, the decision unit 30 determines that there is a field of view angle change. The decision unit 30 determines that the camera is in the course of a large movement, due to photographic composition change, panning photography, following a randomly moving subject and other field of view angle changes, and proceeds to S800.

In S780 the decision unit 30 decides that the camera is in a stationary stable state without large movements due to field of view angle changes, and proceeds to S900.

A discussion will now be given of the decision results of the decision unit in the vibration motion detection device according to the first preferred embodiment of the present invention.

Figure 4A:
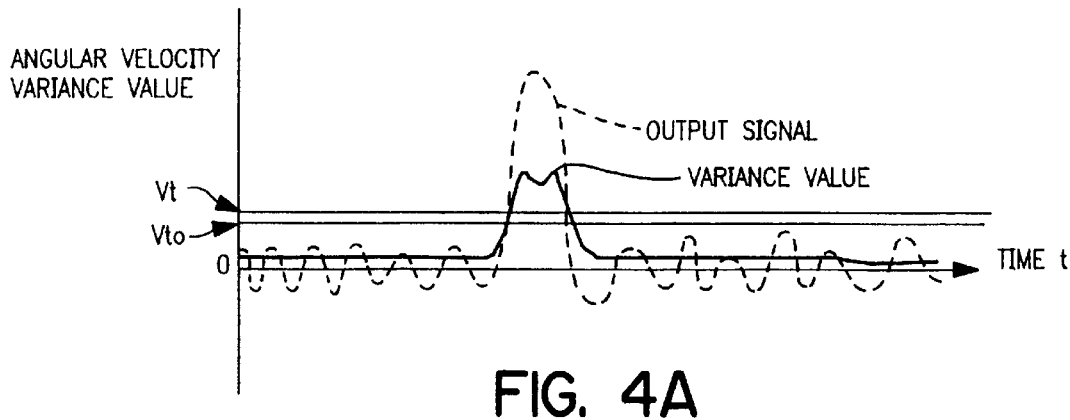
FIG. 4A is a diagram which shows the output signal of the angular velocity sensor, and its variance value when there is a photographic composition change which causes a large field of view angle change in the present invention.
Figure 4B:
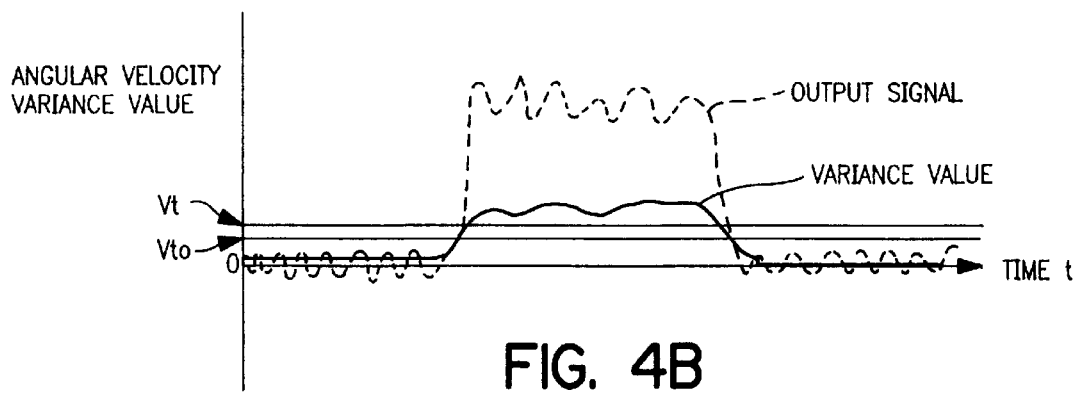
FIG. 4B is a diagram which shows the output signal of the angular velocity sensor, and its variance value when panning photography is in effect in the present invention.
Figure 4C:
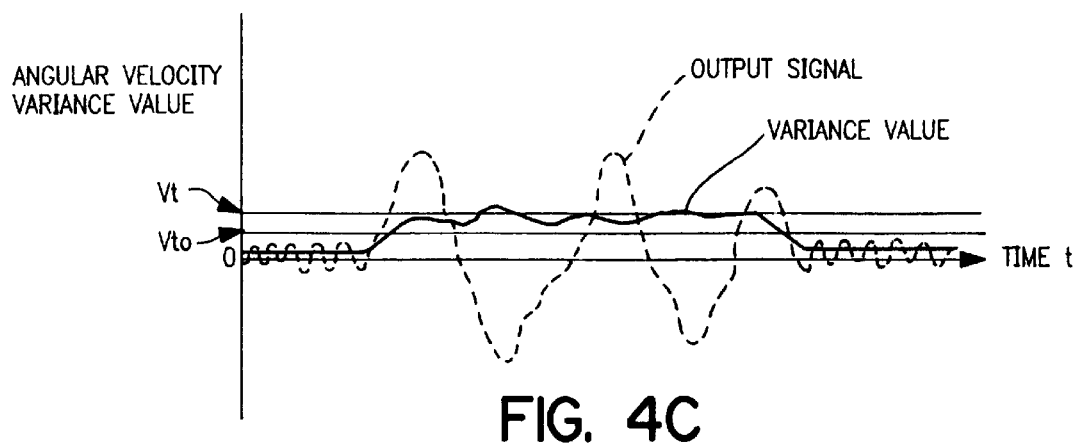
FIG. 4C is a diagram which shows the output signal of the angular velocity sensor, and its variance value when following a randomly moving subject in the present invention.

FIGS. 4A, 4B and 4C are diagrams showing the output signal of the angular velocity sensor and its variance value when there is a field of view angle change. FIG. 4A is a diagram which shows the output signal of the angular velocity sensor, and its variance value, when there is a photographic composition change. FIG. 4B is a diagram which shows the output signal of the angular velocity sensor, and its variance value, when panning photography is in effect. FIG. 4C is a diagram which shows the output signal of the angular velocity sensor, and its variance value, when following a randomly moving subject.

In FIGS. 4A, 4B and 4C, the broken line shows the output signal (angular velocity value) of the angular velocity sensor 10 due to hand tremor motions. The solid line indicates the variance value of the output signal (angular velocity value). In the vibration motion detection device of the first preferred embodiment of the present invention, the decision value $V_t$ can be fixed at an optional value. As shown in FIGS. 4A–4C, in a stationary stable state the variance value $V(y)_N$ is less than $V_{t0}$ equal to 1.5. Setting the decision value $V_t$ at as small as possible, it is possible to quickly detect a field of view angle change, but when the decision value is set too small, there is a possibility of reaching a decision that there was a field of view angle change even in a stationary stable state. However, when the decision value $V_t$ is set to too large, the decision that a field of view angle change has started takes too long. In the first preferred embodiment of the present invention, the decision value $V_t$ is set to 2.0, slightly larger than the variance value $V(y)_N$ ($V_{t0}$)=1.5 in the stationary stable state. As shown in FIGS. 4A–4C, in a photographic composition change, such as when taking panning photographs, or when following a moving subject, the variance $V(y)_N$ provides a value larger than 1.5. Because of this, using the variance value $V(y)_N$ calculated by the decision unit 30, it can be accurately determined that a large movement of the camera is taking place. In particular, in the vibration motion detection device according to the first preferred embodiment of the present invention, as shown in FIG. 4C, the variance $V(y)_N$ also takes on a large value when following a randomly moving object. As a result, as shown in FIGS. 4A and 4B, even when the output signal of the angular velocity sensor 10 is not in one direction, it is possible to accurately detect the movement state of the camera due to a field of view angle change.

Figure 5A:
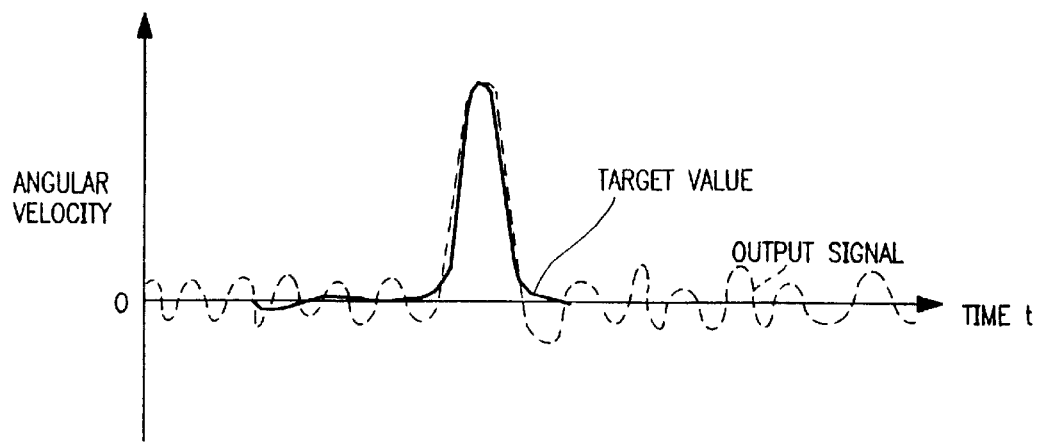
FIG. 5A is a diagram which shows the output signal of the angular velocity sensor, and the target value of control calculated using the target value calculation unit when there is a photographic composition change in the present invention.
Figure 5B:
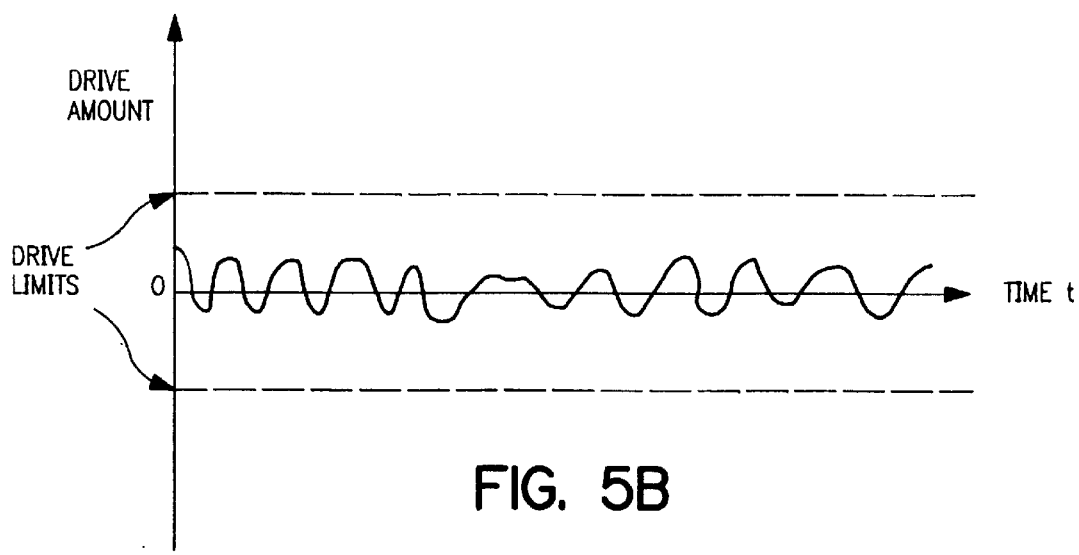
FIG. 5B is a diagram which shows the drive amount of the blurring motion compensation lens of the present invention.

FIG. 5A is a diagram which shows the output signal of the angular velocity sensor, and the target value for controlling the blurring compensation lens 60 calculated using the target value calculation unit when a photographic composition change takes place. FIG. 5B is a diagram which shows the drive amount of the blurring motion compensation lens corresponding to the output signal of FIG. 5A.

Figure 6A:
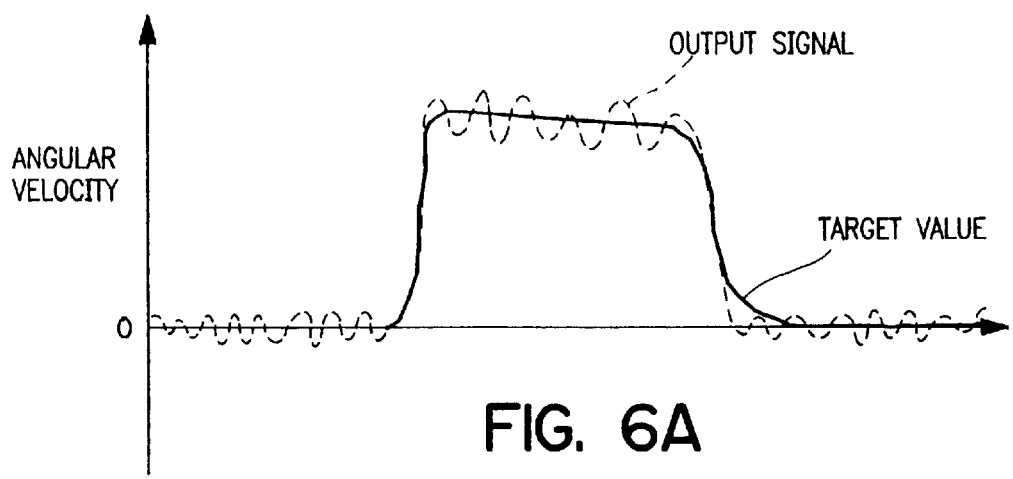
FIG. 6A is a diagram which shows the output signal of the angular velocity sensor, and the target control value calculated using the target value calculation unit when panning photography is in effect in the present invention.
Figure 6B:
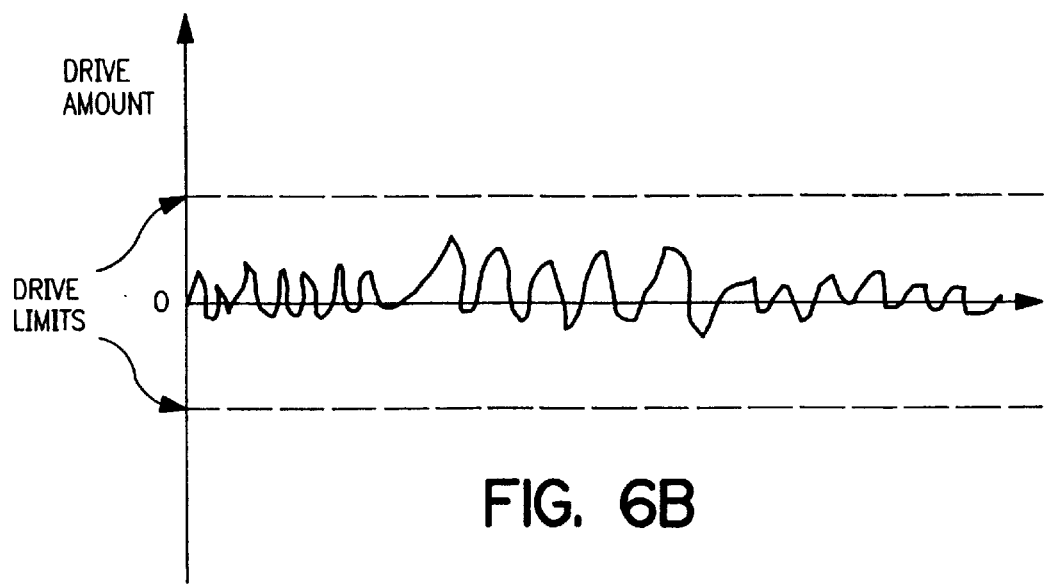
FIG. 6B is a diagram which shows the drive amount of the blurring motion compensation lens of the present invention.

FIG. 6A is a diagram which shows the output signal of the angular velocity sensor, and the target value of control calculated using the target value calculation unit, when panning photography is taking place. FIG. 6B is a diagram which shows the drive amount of the blurring motion compensation lens corresponding to the output value of FIG. 6A.

Figure 7A:
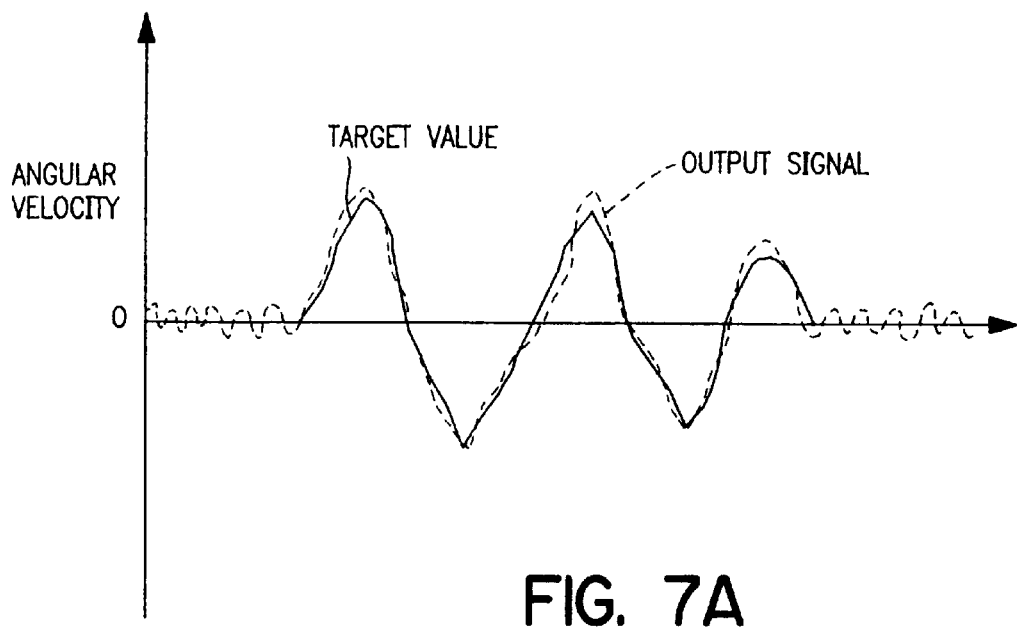
FIG. 7A is a diagram which shows the output signal of the angular velocity sensor, and the target control value calculated using the target value calculation unit when a moving subject is followed using the present invention.
Figure 7B:
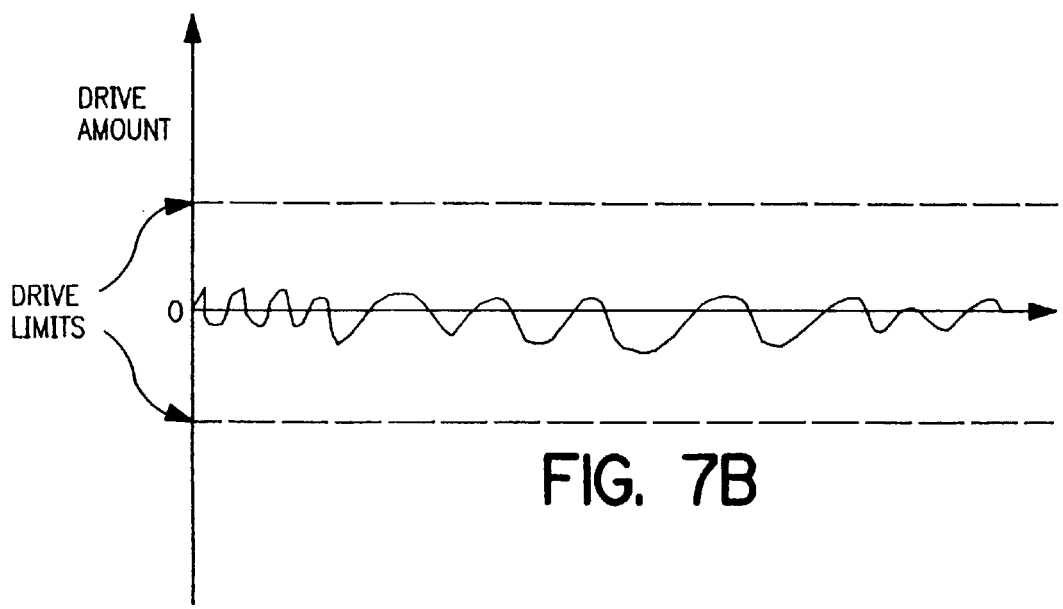
FIG. 7B is a diagram which shows the drive amount of the blurring motion compensation lens of the present invention.
Figure 8:
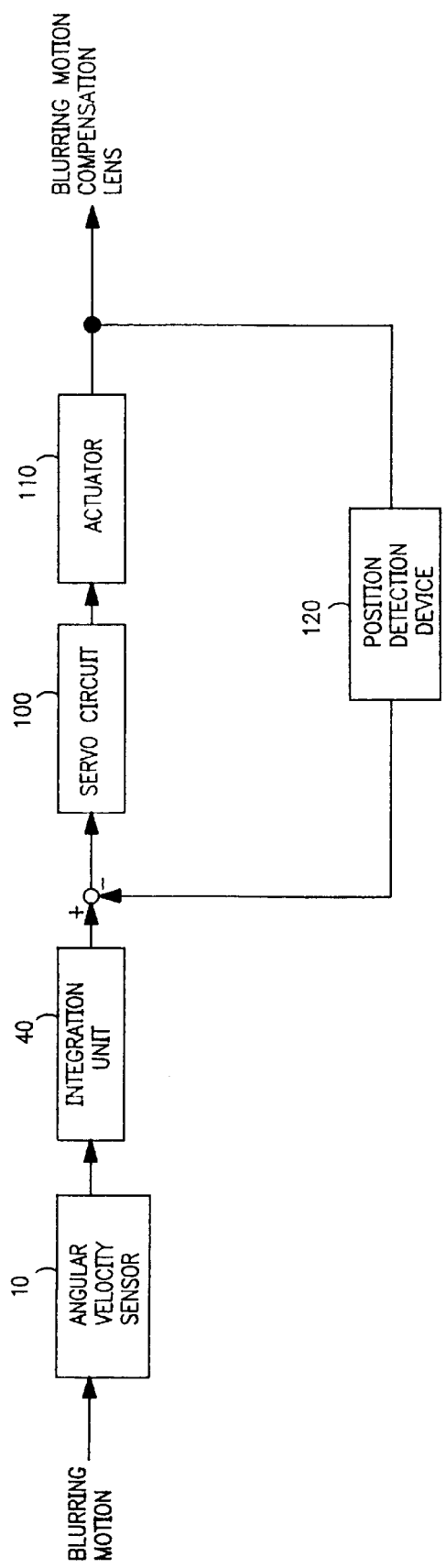
FIG. 8 is a block diagram of a prior art vibration motion compensation device.
Figure 9A:
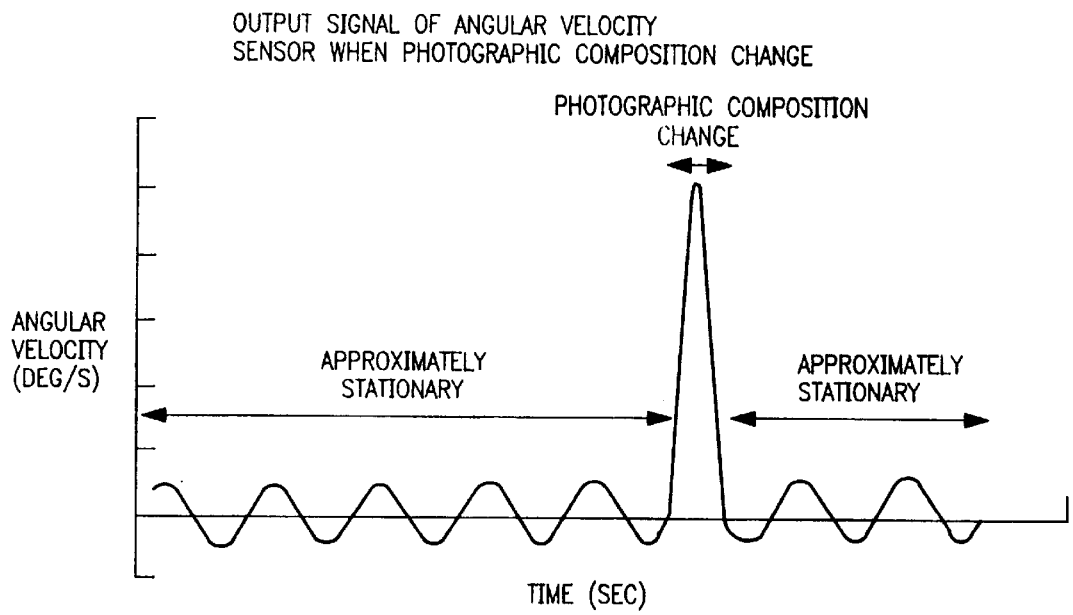
FIG. 9A is a diagram showing an example of the output signal of the angular velocity sensor in a time period when the photographic composition changes occur in the prior art.
Figure 9B:
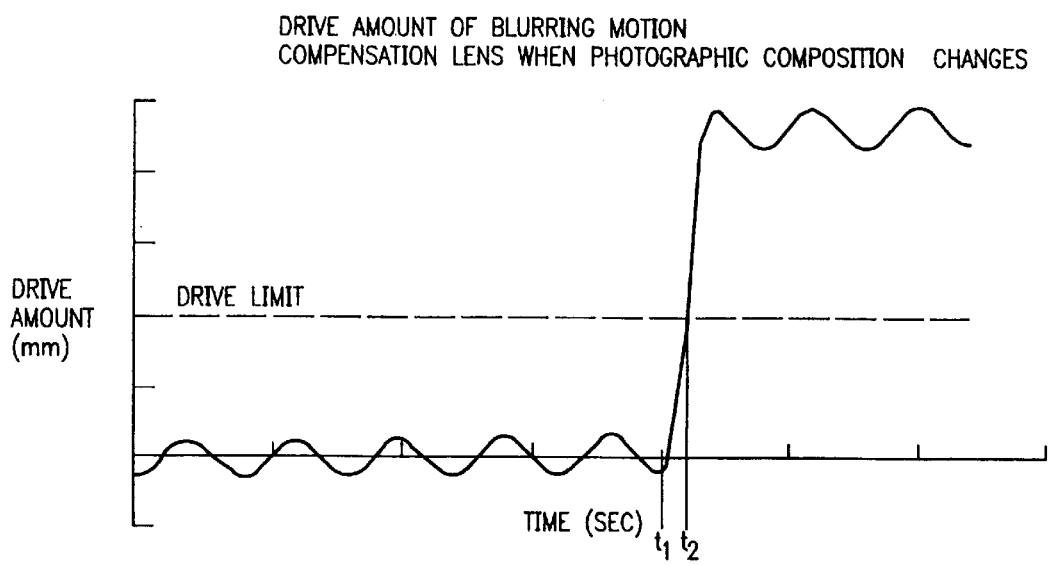
FIG. 9B is a diagram showing the drive amount of the blurring motion compensation lens corresponding to the output signal of FIG. 9A.
Figure 11A:
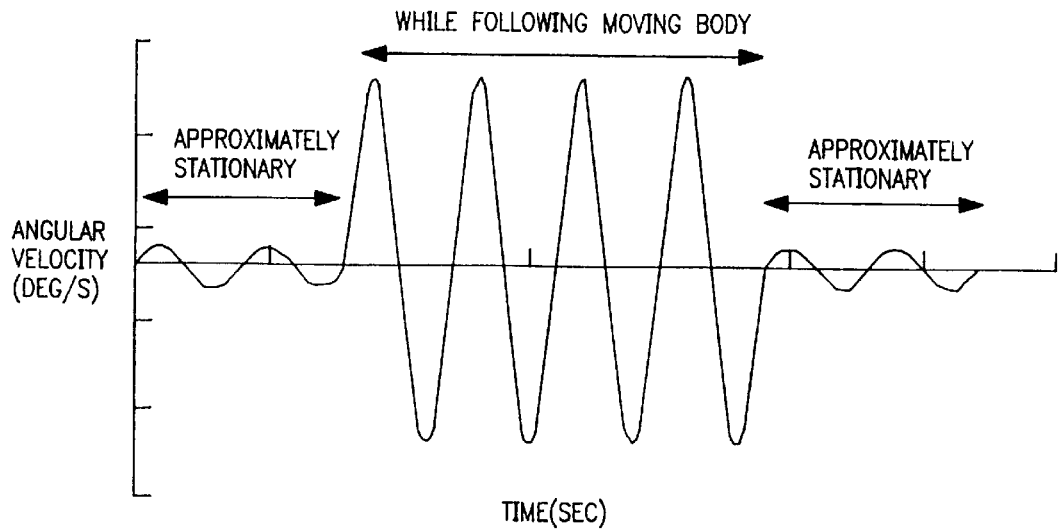
FIG. 11A is a diagram showing an example of the output signal of the angular velocity sensor when following a moving body in the prior art.
Figure 11B:
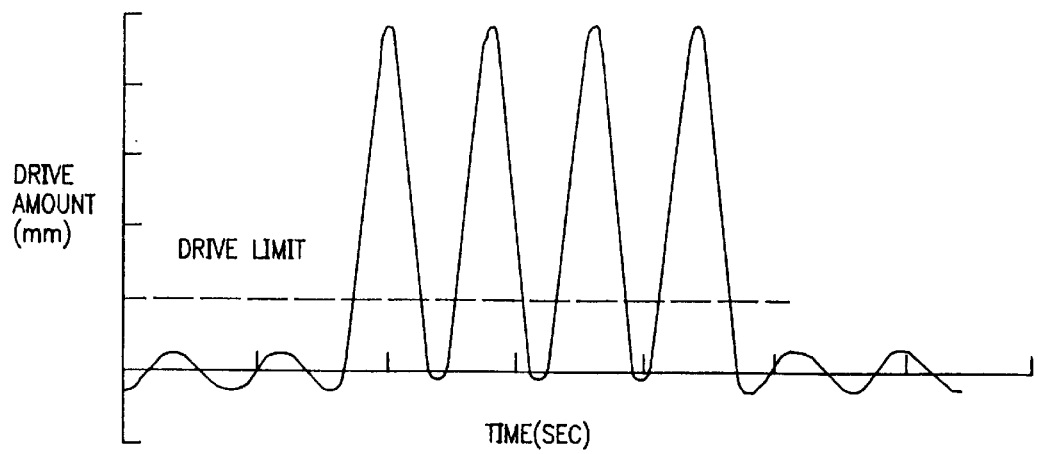
FIG. 11B is a diagram showing the drive amount of the blurring motion compensation lens corresponding to the output signal of FIG. 11A.

FIG. 7A is a diagram which shows the output signal of the angular velocity sensor, and the target value of control calculated by using the target value calculation unit when a randomly moving subject is followed. FIG. 7B is a diagram which shows the drive amount of the blurring motion compensation lens corresponding to the output signal of FIG. 7A.

In FIGS. 5A, 6A and 7A, the broken lines show the output signal (angular velocity value) of the angular velocity sensor 10 due to hand tremor vibration motions. The solid lines, in these figures, are the target value which was calculated by using the target value calculation unit. Further, FIGS. 5B, 6B and 7B show the drive amount of the blurring motion compensation lens including integration of the angular velocity signal, based on the target value. In the first preferred embodiment of the present invention, the target value calculation unit 35 varies the target value of control based on the decision result of the decision unit 30. As a result, as shown in FIGS. 5B, 6B and 7B, the blurring motion compensation lens 60 can compensate for vibration motion without exceeding the drive limits.

In the vibration motion detection device according to the first preferred embodiment of the present invention, a determination can be made of the stationary stable state and composition change state of the camera using the decision unit 30. As a result, when the camera moves due to a photographic composition change, the blurring motion compensation lens also moves but only to compensate for vibrations, and the unpleasant sensation that the image in the viewfinder is not moving while the camera is, can be reduced. In addition, in the case that a large movement was effected by the camera due to a field of view angle change, blurring motion can simultaneously be compensated for. Also, in the case of following a randomly moving subject, vibration motion can be compensated even when the camera oscillates in every possible direction.

Referring to FIG. 3, in the first preferred embodiment of the present invention, the decision unit 30, after a decision level $t_1$ in time has elapsed, calculation proceeds from S740 to S750. This flow from S740 to S750 calculates similar statistical information to that from S720 to S730. However, in contrast to calculations of S720 to S730 which use all existing information data, S740 to S750 only uses information data of a limited interval length (K0). As a result, the calculation method from S740 to S750 is different from the calculation method from S720 to S730.

In the first preferred embodiment of the present invention, the time from the ON operation of the angular velocity sensor 10 until its output is comparatively stable as the decision level $t_1$, and can be accurately determined using only the information of the limited interval length after $t_1$ has elapsed.

Second Preferred Embodiment

In the second preferred embodiment of the present invention, the calculation method of the decision unit 30 in the flow chart FIG. 3 differs from the first preferred embodiment of the present invention.

In S720, the decision unit 30 determines the average value $E(y)_N$ of the output value y of the angular velocity sensor 10 in the elapsed time t using Equation 5.

$$E(y)_N = \frac{N-1}{N} E(y)_{N-1} + \frac{1}{N} y_N \qquad \text{Equation 5}$$

In S730, the decision unit 30 finds the variance value $V(y)_N$ of the elapsed time t using Equation 6.

$$V(y)_N = \frac{N-1}{N}V(y)_{N-1} + \qquad \text{Equation 6}$$

$$\{[E(y)_{N-1}]^2 + [E(y)_N]^2\} + \frac{1}{N}\{Y_N^2 - [E(y)_{N-1}]^2\}$$

In S740, the decision unit 30 determines the average value $E'(y)_N$ of the output value y of the angular velocity sensor 10 in the elapsed time t in the calculation interval length, using Equation 7.

$$E'(y)_N = E'(y)_{N-1} + \frac{1}{K0}(y_N - y_{N-K0}) \qquad \text{Equation 7}$$

In S750, the decision unit 30, using the variance value calculation unit, determines the variance value $V(y)_N$ of the elapsed time t in the calculation interval length according to Equation 8.

$$V'(y)_N = V'(y)_{N-1} + \frac{1}{K0^2}(Y_N - y_{N-K0})^2 - \qquad \text{Equation 8}$$

$$\frac{1}{K0}\{y_{N-K0} - E'(y)_N\}^2 + \frac{1}{K0}\{y_N - E'(y)_N\}^2$$

In the second preferred embodiment of the present invention, when calculating the variance values, the method uses the statistical values calculated in the previous time sampling period. For example, the angular velocity average value $E(y)_N$ is calculated from the time the angular velocity sensor goes ON (t=0 s) to t=1 s. Here, $E(y)_N$ is the average value of the angular velocity from t=0 to t=1. In the next sampling period at t=1.001 s, the average value $E(y)_{N+1}$ from $E(y)_N$, the oldest data (in this example, the angular velocity value at t=0) is taken out among the data used in the calculation of $E(y)_N$, and the data at t=1.001 s is added.

Therefore, in comparison with the first preferred embodiment of the present invention which calculates using all data within the calculation interval, in the case of the second preferred embodiment of the present invention, the amount of calculation can be much smaller, and an increased calculation speed can be realized. In addition, because the amount of data retained for the calculation is reduced, an advantage is realized in a smaller memory size required by the calculation unit.

Further Preferred Embodiments

Without limitation to the above-described preferred embodiment, various modifications and alterations are possible, and these also fall within the scope of the invention.

For example, in the vibration motion detection device according to the preferred embodiments of the present invention, the target value calculation unit 35 calculates the target values of control in the stationary stable state using Equation 9. When the field of view angle changes take place, Equation 10 can be used when K0' is <K0.

$$\frac{1}{K0}\sum_{j=i-K0+1}^{i} y_j \qquad \text{Equation 9}$$

$$\frac{1}{K0'}\sum_{j=i-K0'+1}^{i} y_j \qquad \text{Equation 10}$$

Equations 9 and 10 are moving averages with the calculation interval changed in the stationary stable state and the field of view angle change state.

In the vibration motion detection device according to the preferred embodiments of the present invention, the blurring motion detection unit is not limited to an angular velocity sensor 10. The present invention can utilize a suitable acceleration sensor or other types of sensors. In addition, the decision unit 30 may be built into the target value calculation unit 35. The variance value calculation unit which calculates variance values and the decision unit may be completely separate units. Further, the integration unit 40 may be built into the decision unit 30.

In the preferred embodiments of the present invention, a description was given mentioning examples of a vibration motion detection device included in a single lens reflex still camera. However, the present invention can be suitably applied to video cameras and like photographic devices, as well as binoculars, telescopes, and other like optical devices. In addition, the invention can be used in compact cameras in which exchange of the lens barrels is not possible. Also, the method of calculation of the target values in the cases of the stationary stable state and a field of view angle change state is not limited to the methods of the preferred embodiments of the present invention. The calculation method of the stationary stable state and the calculation method of the photographic composition change state may be varied, and methods resembling these may be used.

Utilizing the preferred embodiments of the present invention, large movement changes which occur in the vibration motion detection unit due to photographic composition changes, panning photography, or the following of a randomly moving subject can be identified.

Also, because the variance value calculation unit calculates the variance value based on average values of the output values which are output within a predetermined time by the vibration motion detection unit, the calculation of variance values can be accomplished with high degree of accuracy.

Further, since the variance calculation unit can use only output values output after a predetermined time had elapsed and at least a portion of the output values which were output by the vibration motion detection unit within a predetermined time, it can accurately obtain variance values and reduce the amount of calculation necessary, thereby shortening the calculation time.

The vibration motion detection unit of the present invention can use either an acceleration detector or a velocity detector to calculate the variance values based on the output signal from either of these devices.

Also, the vibration motion detection unit of the present invention, when the variance value exceeds a predetermined value, can determine that the optical device is moving due to field of view angle change based on using this predetermined value as a target.

Still further, the target value calculation unit of the present invention, based on the variance values, can vary the target values of the blurring motion detection signal, even if there is a photographic composition change state, or when panning or following a randomly moving subject, vibration motion can be accurately compensated for.

The above embodiments of the present invention are also described as relating to a camera. However, embodiments of the present invention are not intended to be limited to a camera. For example, the present invention can be used in devices including, but not limited to, camcorders, motion picture camera, telescopes, binoculars, microscopes, range finding equipment, lasers, fiber optic communications systems, various optical projection systems and CD mastering systems.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A vibration motion detection device, comprising:
    a vibration motion detection unit to detect vibration motion and to output a vibration motion detection signal;
    a variance value calculation unit to calculate a variance value indicating an amount of dispersion of a series of output values of said vibration motion detection device based on said vibration motion detection signal; and
    a motion state decision unit to determine the motion state of said vibration motion detection unit based on said variance value.

2. A vibration motion detection device as recited in claim 1, wherein said variance value calculation unit calculates said variance value based on an average value of a series of output values output from said vibration motion detection unit within a predetermined time period.

3. A vibration motion detection device as recited in claim 1, wherein said variance value calculation unit calculates said variance value based on at least a portion of a series of output values output from said vibration motion detection unit within a predetermined time period and output after the passage of a predetermined time period.

4. A vibration motion detection device as recited in claim 1, wherein said vibration motion detection unit is contained within an optical device.

5. A vibration motion detection device as recited in claim 4, wherein said optical device is a photographic device.

6. A vibration motion detection device as recited in claim 1, wherein said vibration motion detection unit is an acceleration detector to detect acceleration.

7. A vibration motion detection device as recited in claim 1, wherein said vibration motion detection unit is a velocity detector to detect velocity.

8. A vibration motion detection device as recited in claim 1, wherein said motion state decision unit determines that said vibration motion detection unit is in a motion state when said variance value exceeds a predetermined value.

9. A vibration motion detection device as recited in claim 4, wherein said motion state decision unit determines that said optical device is in a motion state due to field of view angle changes when said variance value exceeds a predetermined value.

10. A vibration motion detection device as recited in claim 1, further comprising:
    a target value calculation unit to calculate a target value based on said vibration motion detection signal.

11. A vibration motion detection device as recited in claim 10, wherein said target value calculation unit varies the target value of said vibration motion detection signal based on the variance value.

12. A vibration motion detection device as recited in claim 1, further comprising:
    an amplifier to amplify said vibration motion detection signal; and
    said variance value calculation unit calculates the variance value based on said vibration motion detection signal amplified by said amplifier.

13. A vibration motion detection device as recited in claim 10, further comprising:
    an amplifier to amplify said vibration motion detection signal; and
    said target value calculation unit calculates the target value based on said vibration motion detection signal amplified by said amplifier.

14. A vibration motion detection device, comprising:
    a vibration motion detection unit to detect vibration motion and to output a vibration motion detection signal;
    a variance value calculation unit to calculate a variance value indicating an amount of dispersion of a series of output values of said vibration motion detection device based on said vibration motion detection signal;
    a motion state decision unit to determine the motion state of said vibration motion detection unit based on said variance value; and
    a target value calculation unit to calculate a target value based on said vibration motion detection signal.

15. A vibration motion detection device as recited in claim 14, wherein said variance value calculation unit calculates said variance value based on an average value of a series of output values output from said vibration motion detection unit within a predetermined time period.

16. A vibration motion detection device as recited in claim 14, wherein said variance value calculation unit calculates said variance value based on at least a portion of a series of output values output from said vibration motion detection unit within a predetermined time period and output after the passage of a predetermined time period.

17. A vibration motion detection device as recited in claim 14, wherein said target value calculation unit varies the target value of said vibration motion detection signal based on the variance value.

18. A vibration motion detection device as recited in claim 14, wherein said vibration motion detection unit is contained within a lens barrel.

19. A camera, comprising:
    a camera body having a power supply;
    a lens barrel connectable to said camera body;
    a blurring motion compensation lens contained within said lens barrel;
    a vibration motion detection unit contained within the lens barrel and receiving power from the camera body to detect vibration motion and to output a vibration motion detection signal;
    a variance value calculation unit contained within the lens barrel and receiving power from said camera body to calculate a variance value indicating an amount of dispersion of a series of output values of said vibration motion detection device based on said vibration motion detection signal;
    a motion state decision unit contained within the lens barrel and receiving power from said camera body to determine a motion state of said vibration motion detection unit based on said variance value;
    a target value calculation unit to calculate a target value based on said vibration motion detection signal; and a drive unit contained in said lens barrel and receiving power from said camera body to drive said blurring motion compensation lens based on said motion state and said target value, wherein said blurring motion compensation lens compensates for unintentional vibration motion of said camera and does not compensate for intentional motion of said camera.

20. A camera as recited in claim 19, wherein said variance value calculation unit calculates said variance value based on an average value of a series of output values output from said vibration motion detection unit within a predetermined time period.

21. A camera as recited in claim 19, wherein said variance value calculation unit calculates said variance value based on at least a portion of a series of output values output from said vibration motion detection unit within a predetermined time period and output after the passage of a predetermined time period.

22. A camera as recited in claim 19, wherein said target value calculation unit varies the target value of said vibration motion detection signal based on the variance value.

23. A motion compensation device to discriminate between undesired movement and intentional movement, comprising:

a motion detection device to detect motion and to output a motion detection signal;

a variance value determination unit to determine a variance value indicating an amount of dispersion of a series of output values of said motion detection device based on all previous outputs from the motion detection device from a detection commencement time; and a motion state detection unit to detect whether detected motion is intentional based on the variance value.

* * * * *